(12) United States Patent
Pikarski

(10) Patent No.: US 12,010,132 B2
(45) Date of Patent: Jun. 11, 2024

(54) AUTOMATICALLY MITIGATING POTENTIAL SERVICE ATTACKS BASED ON LEARNED USAGE IMPACT PATTERNS

(71) Applicant: Perimeter 81 LTD, Tel-Aviv (IL)

(72) Inventor: Rony Pikarski, Netanya (IL)

(73) Assignee: Check Point SSE Solutions LTD., Tel Aviv (IL)

( * ) Notice: Subject to any disclaimer, the term of this patent is extended or adjusted under 35 U.S.C. 154(b) by 301 days.

(21) Appl. No.: 17/685,418

(22) Filed: Mar. 3, 2022

(65) Prior Publication Data
US 2023/0283619 A1 Sep. 7, 2023

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01); *H04L 63/1441* (2013.01)

(58) Field of Classification Search
CPC ............. H04L 63/1425; H04L 63/1416; H04L 63/1441; H04L 63/1458; G06N 20/00; G06N 3/09
See application file for complete search history.

(56) References Cited

U.S. PATENT DOCUMENTS

| | | | | |
|---|---|---|---|---|
| 11,489,815 | B2* | 11/2022 | Webb | H04L 63/1458 |
| 2016/0020969 | A1* | 1/2016 | Vasseur | H04L 43/062 |
| | | | | 370/252 |
| 2017/0070531 | A1* | 3/2017 | Huston, III | H04L 63/0428 |
| 2017/0257388 | A1* | 9/2017 | Addepalli | G06N 20/00 |
| 2019/0182274 | A1* | 6/2019 | Doron | G06N 3/044 |
| 2020/0186563 | A1* | 6/2020 | Convertino | G06N 20/00 |

* cited by examiner

*Primary Examiner* — Abiy Getachew
(74) *Attorney, Agent, or Firm* — Rivka Friedman

(57) ABSTRACT

Disclosed herein are systems and methods for automatically mitigating potential network services attacks based on service usage patterns learned using Machine Learning (ML) comprising, collecting operational data indicative of resource utilization of one or more network services serving a plurality of connections and of a plurality of operational factors of the plurality of connections, detecting degradation of the network service(s) based on analysis of the operational data, applying trained ML model(s) to the operational data in order to identify negative operational factor(s) of one or more suspected connections to the network service estimated to induce the degradation where the one or more ML model is trained to predict an impact pattern induced by each of a plurality of operational factors on the resource utilization of the one or more network services, and disconnecting, at least temporarily, the suspected connection(s) from the network service(s).

18 Claims, 3 Drawing Sheets

AUTOMATICALLY MITIGATING POTENTIAL SERVICE ATTACKS BASED ON LEARNED USAGE IMPACT PATTERNS

FIELD AND BACKGROUND OF THE INVENTION

The present invention, in some embodiments thereof, mitigating attacks on network services and, more specifically, but not exclusively, to mitigating attacks on network services by monitoring the services using Machine Learning (ML) trained to learn impact patterns of usage of the network services.

Network services have long become a key element in almost any aspect of modern day life, ranging over numerus sectors and applications, from communication services (e.g. email, media streaming, etc.), social media platforms, gaming, financial applications, research and development infrastructures, management applications, through medical, industrial and agricultural services to security and defense applications.

High performance of the network services, specifically in terms of accessibility, response time, robustness, up/down time and/or the like may be essential to ensure their reliability in order to effectively and efficiently serve their clients.

SUMMARY OF THE INVENTION

An objective of the embodiments of the disclosure is to provide a solution which mitigates or solves the drawbacks and problems of conventional solutions. The above and further objectives are solved by the subject matter of the independent claims. Further advantageous embodiments can be found in the dependent claims.

The disclosure aims at providing a solution for detecting service degradation of network services and disconnect at least temporarily suspected connection(s) to the network service predicted by trained ML model(s) to consume major resources of the network service thus degrading its operation.

According to a first aspect of the present invention there is provided a computer implemented method of automatically mitigating potential network services attacks based on service usage patterns learned using Machine Learning (ML), comprising using one or more processors for:

Collecting operational data indicative of resource utilization of one or more network services serving a plurality of connections and of a plurality of operational factors of the plurality of connections.

Detecting degradation of the one or more network services based on analysis of the operational data.

Applying one or more trained ML model to the operational data in order to identify one or more negative operational factors of one or more suspected connections to the network service estimated to induce the degradation. The one or more ML model are trained to predict an impact pattern induced by each of a plurality of operational factors of a plurality of connections on the resource utilization of the one or more network services;

Disconnecting, at least temporarily, the one or more suspected connections from the one or more network services.

According to a second aspect of the present invention there is provided a system for automatically mitigating potential network services attacks based on service usage patterns learned using Machine Learning (ML), comprising one or more processors configured to execute a code. The code comprising:

Code instructions to collect operational data indicative of resource utilization of one or more network services serving a plurality of connections and of a plurality of operational factors of the plurality of connections.

Code instructions to detect degradation of the one or more network services based on analysis of the operational data.

Code instructions to apply one or more trained ML model to the operational data in order to identify one or more negative operational factors of one or more suspected connections to the network service estimated to induce the degradation. The one or more ML model are trained to predict an impact pattern induced by each of a plurality of operational factors of a plurality of connections on the resource utilization of the one or more network services.

Code instructions to disconnect, at least temporarily, the one or more suspected connections from the one or more network services.

In a further implementation form of the first and/or second aspects, the operational data comprises one or more application layer parameters of the one or more network services. The one or more application layer parameters are members of a group comprising: a latency, a response time, a number of connections, and/or a traffic volume.

In a further implementation form of the first and/or second aspects, the operational data comprises one or more transport layer parameters relating to the one or more network services. The one or more transport layer parameters are members of a group comprising: a connection error, a connection abort event, and/or a request response time.

In a further implementation form of the first and/or second aspects, the operational data comprises one or more resource utilization parameters relating to one or more hardware resources of one or more servers hosting the one or more network services. The one or more resource utilization parameters are members of a group comprising: a processor utilization, a dynamic memory utilization, a persistent memory utilization, and/or a network interface utilization.

In a further implementation form of the first and/or second aspects, each of the plurality of operational factors is a member of a group comprising: a type of a respective connection, a protocol of the respective connection, an origin of the respective connection, a destination of one or more packets received via the respective connection, a number of requests from the respective connection per second, a number of responses to the respective connection per second, an average delay between a request and a response on the respective connection, a traffic volume received via the respective connection, and/or a traffic volume transmitted via the respective connection.

In a further implementation form of the first and/or second aspects, each of the one or more negative operational factors is characterized by having a significant impact on the resource utilization of the one or more network services due to significant increase in utilization of one or more hardware resources of the one or more network services.

In a further implementation form of the first and/or second aspects, the one or more ML models are supervised learning ML models trained using a training dataset comprising labeled training operational data correlating between a plurality of operational factors and resource utilization of the one or more network services.

In a further implementation form of the first and/or second aspects, the training operational data is captured for the network service during a predefined time period.

In a further implementation form of the first and/or second aspects, the one or more ML models are further trained online after deployed to identify potential negative operational factors estimated to induce service degradation of the one or more network service.

In an optional implementation form of the first and/or second aspects, one or more previously unknown negative operational factors are identified based on a delta between detected degradation of the one or more network services and predicted degradation of the one or more network services predicted by the one or more ML models based on identified negative operational factors excluding the one or more previously unknown negative operational factors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
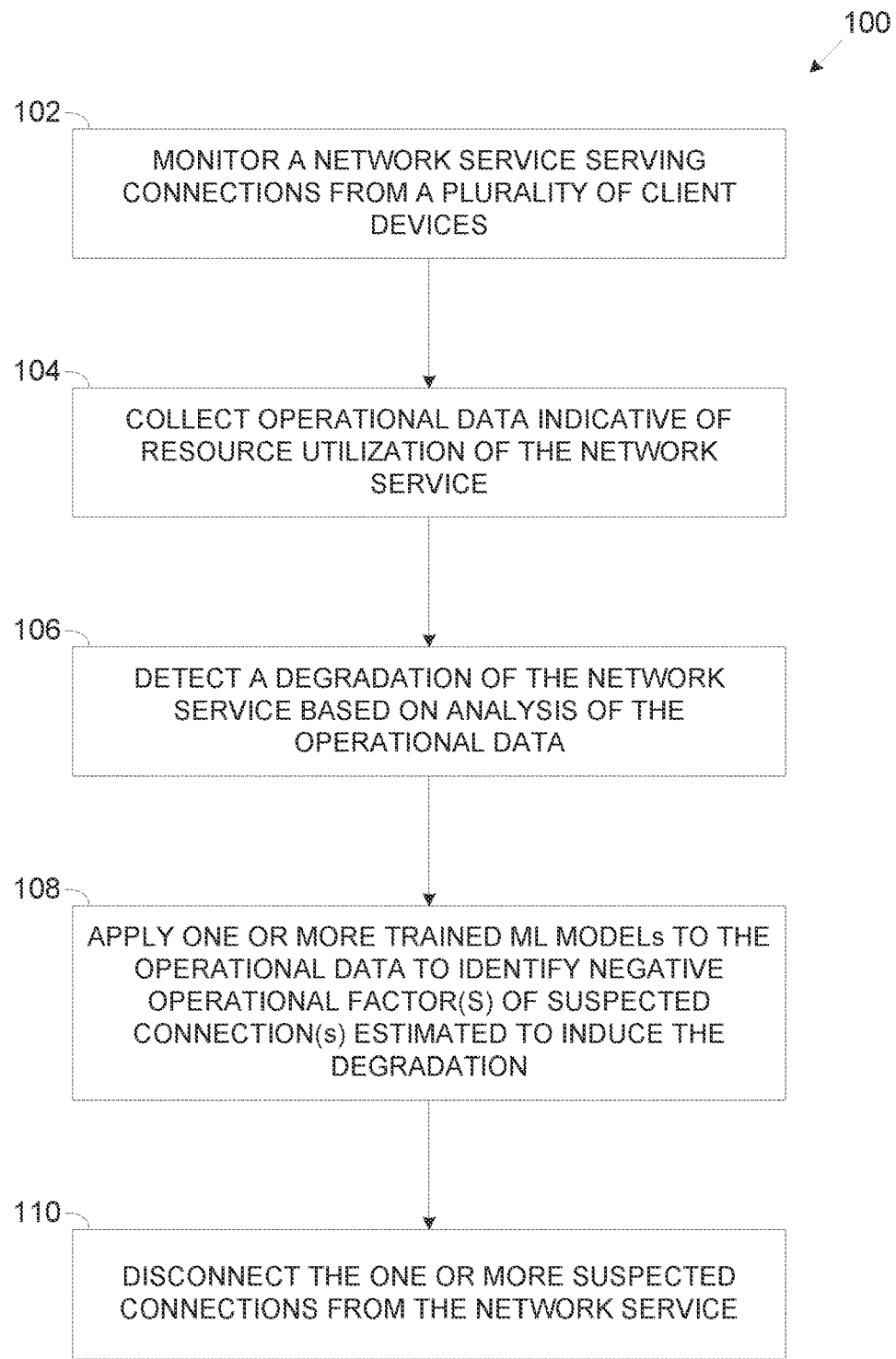
FIG. 1 is a flowchart of an exemplary process of mitigating automatically potential attacks on network services using ML learned impact patterns of connections to the network services on resource utilization of the network services, according to some embodiments of the present invention.

The present invention, in some embodiments thereof, mitigating attacks on network services and, more specifically, but not exclusively, to mitigating attacks on network services by monitoring the services using Machine Learning (ML) trained to learn impact patterns of usage of the network services.

According to some embodiments of the present invention, there are provided methods, systems and computer program products for mitigating cyberattacks on a network service executed by one or more servers by monitoring the network service serving a plurality of connections from a plurality of client devices to collect operational data relating to the network service, and applying one or more Machine Learning (ML) models to the operational data to identify and disconnect one or more suspected connections estimated to degrade operation, reliability and/or performance of the network service.

The suspected connections may be typically malicious connections initiated as part of a cyberattack in attempt to consume extensive resources of the network service and overload so that performance of the network service is dramatically reduced potentially to a point that it becomes unavailable and thus inaccessible to legitimate users.

The ML model(s), for example, a neural network may be trained, using operational data captured over time for the network service, to learn impact patterns of impact of a plurality of operational factors of the connections to the network service on resource utilization of the network service, specifically on utilization of hardware resources of the server(s) hosting the network service, for example, computing resources, storage resources, networking resources, and/or the like.

Specifically, the ML model(s) may be trained in one or more supervised training sessions using annotated operational data comprising labeled training samples correlating between operational factors of connections to the network service on the resource utilization of the network service.

The operational factors of the connections may comprise, for example, a type of the respective connection, a protocol of the respective connection, an origin of the respective connection, a destination of one or more packets received via the respective connection, a number of requests received/transmitted from/to the respective connection per time unit (e.g. per second), an average delay between requests and corresponding responses on the respective connection, a volume of traffic exchanged via the respective connection, and/or the like.

The trained ML model(s) may be applied to operational data captured for the network service, optionally in real-time, to identify one or more negative operational factors of one or more suspected connections estimated by the ML model(s) to induce the degradation in the performance of the network service.

Based on the prediction of the ML model(s), one or more of the suspected connection(s) associated with the estimated negative operation factor(s) may be disconnected, temporarily and/or permanently from the network service(s) to restore serviceability of the network service.

This is because the suspected connections may be assumed with high confidence to be malicious connections initiated in attempt to attack the network service, cause it to consume massive resources of its hosting server(s) and thus disrupt its operation and serviceability, for example, increase latency and response time of the service potentially to the point of the network service becoming unavailable.

However, even if the suspected connections are legitimate connections causing the network service to consume major resources this degrading its performance and reducing its reliability and/or availability, such legitimate connections may be disconnected, at least temporarily, in order to enable the network service to restore its serviceability.

Using trained ML models to identify and disconnect suspected connections estimated to degrade operation, reliability and/or performance of a network service based on learned impact patterns of operational factors of the connections on the resource utilization of the network service may present major advantages and benefits compared to exiting cyberattacks mitigation systems and methods.

First, mapping the operational factors of the network service connections to resource utilization of the network service, specifically to utilization of hardware resources of the server(s) hosting the network resources may enable accurate, reliable and/or affective detection of suspected connections since the performance, reliability and/or availability of the network service is directly dependent on availability of the hardware resources. Therefore, detecting and disconnecting accordingly connections having (associated with) negative operational factors may significantly increase reliability, availability and/or performance of the network service.

Moreover, since the ML model(s) are adjustable and learnable, during the training session(s) and optionally after deployment, the ML model(s) may efficiently adapt and learn the impact patterns of the operational factors of the connections, typically complex combinations of operational factors, to accurately and/or reliably map each operational factor to its resource utilization. Using the trained and constantly evolving ML model(s) may therefore significantly increase the ability to detect suspected connections compared to existing methods relying on rules defining usage and/or utilization characteristics of the operational factors since such rule based methods may be highly static and thus unable to adapt to dynamic changes in resource utilization characteristics of the operational factors.

Furthermore, since the ML model(s) are trained to learn the impact patterns of the operational factors of the connections to the network service, implicit and/or previously unknown negative operational factors may be identified and/or estimated based on a difference (delta) between the observed degradation and/or resource utilization of the network service and the degradation and/or resource utilization predicted for the network service by the ML model(s). This may enable detecting and disconnecting suspected connections having previously unknown and/or implicit negative operational factors which may be undetectable by the rule-based existing methods.

In addition, further training the ML model(s) online, using operational data collected after the ML model(s) is deployed to support detection of suspected connections to the network service, may enable the ML model(s) to adapt, adjust and/or learn the specific impact patterns specific to specific network services. As such, the impact patterns identified and learned online by ML model(s) may be highly accurate reliable and/or consistent which may significantly increase the performance of the ML model(s) which may detect, with increased accuracy, reliability and/or consistency, suspected connections estimated to degrade the serviceability of the specific network service for which the ML model(s) is used.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of mitigating automatically potential attacks on network services using ML learned impact patterns of connections to the network services on resource utilization of the network services, according to some embodiments of the present invention; and An exemplary process 100 may be executed to trace service degradation of one or more network services to one or more negative operational factors of one or more connections to the network service(s) which may indicate that their respective connections may consume significant resources of the network service(s) and may be therefore suspected as potential malicious connections.

Specifically, the negative operational factor(s) may be detected by using one or more ML models trained to predict impact patterns induced by a plurality of operational factors of a plurality of connections to the network service(s). The trained ML model(s) may be applied to operational data collected by monitoring the connections to the network service(s) to identify one or more operational factors of the connections and predict one or more negative factors of the identified operation factors.

Based on the prediction of the ML model(s), one or more suspected connections associated with the negative operation factor(s) may be disconnected, temporarily and/or permanently from the network service(s) to restore serviceability of the network service(s).

While the suspected connections and potentially all of them may be legitimate connections consuming significant resources of the network service, it may be highly likely that one or more of the suspected connections may be malicious connections initiated in attempt to attack the network service(s), heavily consume its resources and thus disrupt its operation, for example, increase latency and response time of the service potentially to the point of the network service becoming unavailable.

Figure 2:
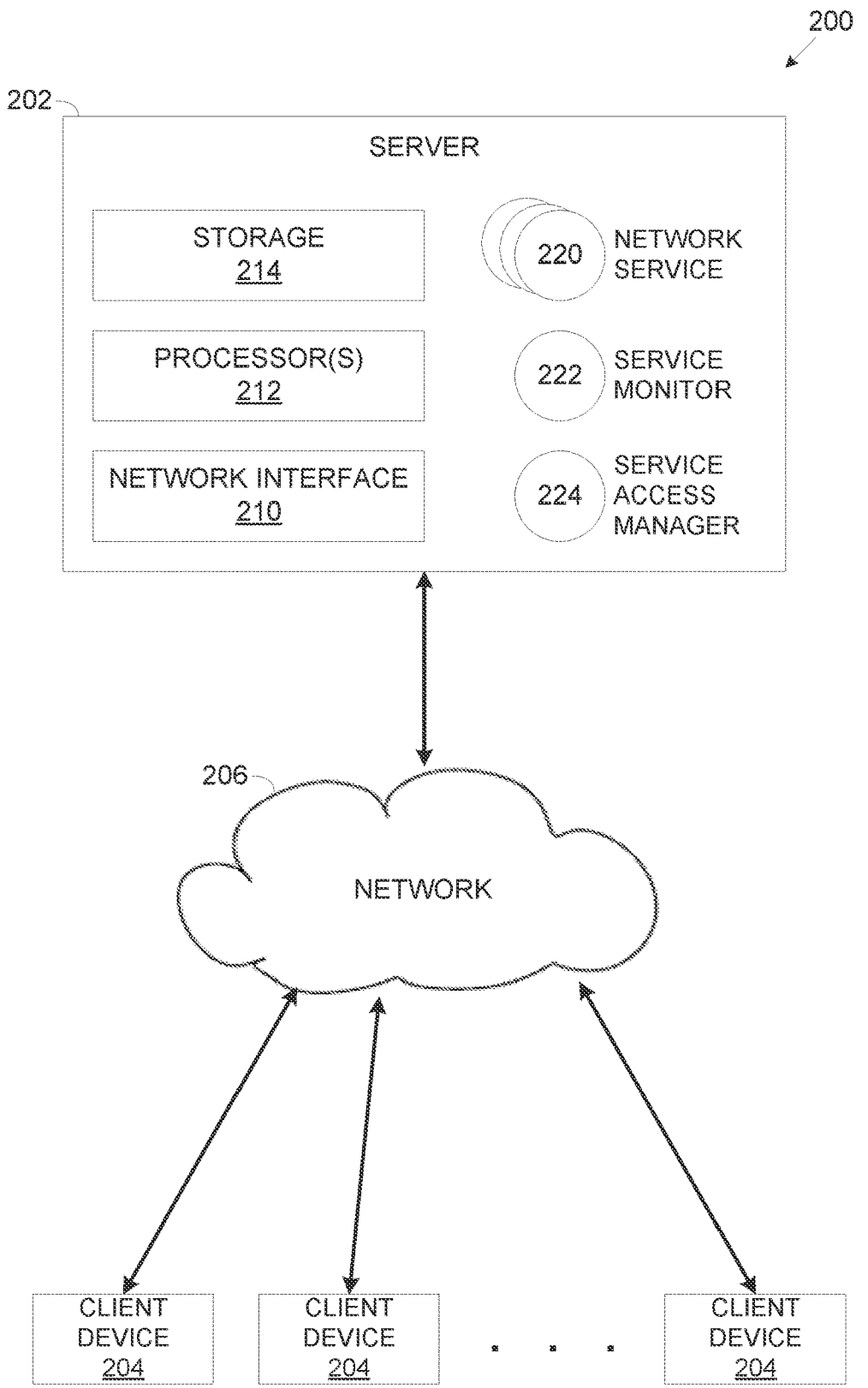
FIG. 2 is a schematic illustration of an exemplary system for mitigating automatically potential attacks on network services using ML learned impact patterns of connections to the network services on resource utilization of the network services, according to some embodiments of the present invention.

Reference is also made to FIG. 2, which is a schematic illustration of an exemplary system for mitigating automatically potential attacks on network services using ML learned impact patterns of connections to the network services on resource utilization of the network services, according to some embodiments of the present invention.

An exemplary networked system 200 may comprise a server 202, for example, a server, a computing node, a cluster of computing nodes and/or the like hosting one or more services 220 accessible by a plurality of client devices 204, for example, a server, a computer, a mobile device (e.g. Smartphone, tablet, etc.), a wearable device, an IoT device and/or the like.

The client devices 204 may access the server 202 via a network 206 comprising one or more wired and/or wireless networks, for example, a Local Area Network (LAN), a Wireless Local Area Network (WLAN), a Wide Area Network (WAN), a Municipal Area Network (MAN), a cellular network, the internet and/or the like.

The server 202 may comprise a network interface 210, a processor(s) 212 for executing the process 100 and a storage 214 for storing data and/or code (program store).

The network interface 210 may include one or more wired and/or wireless network interfaces for connecting to the network 206, for example, a LAN interface, a WLAN interface, a WAN interface, a MAN interface, a cellular interface and/or the like.

The processor(s) 212, homogenous or heterogeneous, may include one or more processing nodes and/or cores arranged for parallel processing, as clusters and/or as one or more multi core processor(s).

The storage 214 may include one or more non-transitory persistent storage devices, for example, a Read Only Memory (ROM), a Flash array, a Solid State Drive (SSD), a hard drive (HDD) and/or the like. The storage 232 may also include one or more volatile memory devices, for example, a Random Access Memory (RAM) component, a cache and/or the like. The storage 214 may further comprise one or more network storage devices, for example, a storage server, a Network Accessible Storage (NAS), a network drive, a database server and/or the like accessible through the network interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may further include, integrate and/or utilize one or more hardware modules available in the server 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), a network processor, an Artificial Intelligence (AI) accelerator and/or the like.

As such, the processor(s) 212 may execute one or more functional modules, for example, the service(s) 220, a service monitor 222 and a service access manager 224 each utilized by one or more software modules, one or more of the hardware modules and/or a combination thereof.

Optionally, the server 200, specifically the service(s) 220 and/or the service monitor 222 and the service access manager 224 may be provided, executed and/or utilized at least partially by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

For brevity, the process 100 is described for monitoring a single network service 220 accessible by a plurality of client device 204 to detect service degradation, use one or more trained ML models to trace the degradation to one or more suspected connections of the client devices 204 and control access of the suspected connection(s) to the network service 220 predicted by the ML model(s) as potentially malicious.

This, however, should not be construed as limiting since the process 100 may be easily and intuitively expanded, as may be apparent to a person skilled in the art, to monitor a plurality of network services 220 each accessible to a plurality of client device 204 and control access of the connections of the client devices 204 based on prediction of the trained ML model(s) to disconnect suspected connection(s) predicted by the ML model(s) to be potentially malicious.

As shown at 102, the process 100 starts with the service monitor 222 monitoring the network service 220 executed by the server 202 to serve a plurality of connections from the plurality of client devices 204.

The service monitor 222 monitoring the network service 220 may monitor the network service 220, the connections of the client devices 204 to the network service 220, resource utilization of the server 202 by the network service 220 and/or the like.

To this end, the service monitor 222 may use one or more methods, algorithms and/or tools as known in the art which may be external to the service monitor 222 and/or integrated in the service monitor 222. For example, the service monitor 222 may use a network sniffer and/or network analyzer configured to monitor the network interface 210 of the server 202. In another example, the service monitor 222 may use a hardware resources usage meter configured to monitor usage of one or more hardware resources of the server 202, for example, processing resources (e.g. processor(s) 212, cache, pipeline(s), etc.), memory resources (e.g. RAM, disk, Flash, etc.), network resources (e.g. network adapter(s), network processor(s), etc.), and/or the like. In another example, the service monitor 222 may use a task manager configured to monitor usage of one or more of the hardware resources of the server 202 per task executed by the server 202.

As shown at 104, monitoring the network service 220, the service monitor 222 may collect and/or capture operational data relating to the network service 220 and to the connections of the client devices 204 to the network service 220.

The operational data may comprise one or more operational parameters relating to the network service 220. For example, the operational data may include one or more applications layer parameters relating to an application layer (L7) of the network service 220, for example, a response time, a latency, a number of connections to the network service 220, a number of requests received via the connections, a volume of traffic transmitted via the connections, and/or the like. In another example, the operational data may include one or more transport layer parameters relating to a transport layer (L4) of the network service 220, for example, a connection error, a connection abort event, a request response time, and/or the like. Connection errors as known in the art may include, for example, REJ indicating a connection attempt is rejected, RSTO indicating a connection was established but aborted by the originator in response to RST, RSTR indicating a connection was established but aborted by the responder.

The operational data may further comprise one or more resource utilization parameters relating to one or more of the hardware resources of the server 202 hosting the network service 220. For example, the utilization parameters may include a processor utilization of the processor(s) 212. In another example, the utilization parameters may relate to storage utilization of the storage 214, for example, a dynamic memory utilization of one or more of the volatile memory devices, a persistent memory utilization of one or more of the persistent non-volatile memory devices, and/or the like. In another example, the utilization parameters may relate to network utilization of the server 202, for example, network interface utilization of the network interface 210, utilization of one or more network processors of the server 210, and/or the like.

The operational data may also comprise one or more one or more operational factors relating to each of the connections of the client devices 204 to the network service 220.

For example, the operational factors of one or more of the connections may include a type of the respective connection, for example, a unicast, a multicast, a broadcast, and/or the like. In another example, the operational factors of one or more of the connections may include a protocol of the respective connection, for example. Transmission Control Protocol (TCP), User Datagram Protocol (UDP), and/or the like.

In another example, the operational factors of one or more of the connections may include an origin of the respective connection, i.e., the originating client device 204 connecting to the network service 220. In another example, the operational factors of one or more of the connections may include a destination of one or more packets received via the respective connection.

In another example, the operational factors of one or more of the connections may include a number of requests received from the respective connection per time unit, for example, per second. In another example, the operational factors of one or more of the connections may include a number of responses to requests received via the respective connection per time unit, for example, per second. In another example, the operational factors of one or more of the connections may include an average delay between one or more requests and corresponding responses on the respective connection.

In another example, the operational factors of one or more of the connections may include a volume of traffic exchanged via the respective connection, for example, a volume of traffic received via the respective connection, a traffic volume transmitted via the respective connection, and/or the like.

As shown at 106, the service monitor 222 may detect degradation of the network service 220 based on analysis of the operational data.

For example, the service monitor 222 may detect degradation of performance of the network service 220 due to overload of requests received from one or more of the connections identified based on analysis of one or more of the transport layer parameters relating to the network service 220, for example, requests response time, connection failure(s), connection abort(s) and/or the like.

In another example, the service monitor 222 may detect degradation of performance of the network service 220 based on analysis of one or more of the resource utilization parameters indicating resources use by the network service 220. For example, based on analysis of the processor utilization, the dynamic memory utilization, and/or the persistent memory utilization, the service monitor 222 may determine that the network service 220 consumes increased and/or excessive hardware resources of the server 202 which may be indicative of degradation of the performance of the network service 220. In another example, based on analysis of the network interface utilization, the network processor utilization and/or the like, the service monitor 222 may determine that the network service overloads the network resources of the server 202 which may be indicative of degradation of the performance of the network service 220.

In another example, the service monitor 222 may detect degradation of the performance of the network service 220 based on analysis of one or more of the operational factors of one or more of the connections to the network service. For example, based on analysis of the delay between one or more requests and their corresponding responses transmitted via one or more of the connections, the service monitor 222 may determine that delay exceeds a certain threshold value which may be indicative of degradation of the performance of the network service 220.

As shown at 108, the service monitor 222 may apply one or more trained ML models to the operational data in order to identify one or more negative operational factors of one or more suspected connections of the plurality of connections to the network service 220 which are estimated to induce the performance degradation of the network service 220.

The ML model(s) may be trained to predict a plurality of impact patterns of impact induced by each of the plurality of operational factors of the plurality of connections of the plurality of client devices 204 to the network service 220 on the resource utilization of the network service 220.

The ML model(s) may comprise, for example, a neural network, a Support Vector Machine (SVM) and/or the like. For example, the ML model(s) may be utilized using one or more neural network such as, for example, a convolutional Neural Network (CNN), a Recurrent Neural Networks (RNN), a Deep Neural Networks (DNN), a Modular Neural Networks (MNN), an autoencoder, a regularized autoencoder, a concrete autoencoder, a variational autoencoder, an SVM, a Bayesian network, a Density-based model, an HMM, an outlier detection model (e.g. cluster analysis, deviation from association, fuzzy logic) and/or the like.

Moreover, the ML model(s) may comprise one or more supervised learning ML models trained in one or more training sessions using one or more training datasets captured for the network service 220 in the system 200 during a predefined time period, for example, a day, a week, a month and/or the like.

Each training dataset may be annotated to include labeled training operational data correlating between a plurality of operational factors of a plurality of connections of a plurality of client devices such as the client devices 204 to the network service 220 and the resource utilization of the network service 220. In other words, the training operational data included in each training dataset may correlate between each of the plurality of operational factors and corresponding resource utilization of the hardware resources of the server 202 by the network service 220.

During the training session(s), the ML model(s) may adapt, adjust, evolve and/or otherwise learn the impact of each of the plurality of operational factors on the resource utilization of the server 202 by the network service 220. The ML model(s) may thus learn to identify a plurality of impact patterns of the plurality of operational factors individually and/or combined on utilization of the hardware resources of the server 202 by the network service 220.

Optionally, the ML model(s) may be further trained online after deployed and used by the service monitor 222 to identify potential negative operational factors estimated to induce service degradation of the network service 220.

The trained ML model(s) applied to the operational data collected by the service monitor 220 may therefore identify one or more negative operational factors of one or more suspected connections estimated to induce the performance degradation of the network service 220.

Each negative operational factor may be characterized by having a significant impact on the resource utilization of the network service 220 due to a significant increase in the utilization of one or more of the hardware resources of the server 202 consumed by the network service 220.

The trained ML model(s) may identify the negative operational factor(s) by detecting deviation from the impact patterns learned for the operational factors during training.

For example, assuming that the trained ML model(s) applied to the collected operational data, detects that while serving a certain connection characterized by a certain operational factor, for example, TCP protocol optionally combined with one or more other operational factors, for example, an X milliseconds response time and Y requests per second, the resource utilization of the hardware resource(s) of the server 202 by the network service 220 is RU(RT) (Real Time Resource Utilization).

Further assuming that during training, the ML model(s) learned a certain impact pattern defining a certain estimated resource utilization R(P) (Pattern Resource Utilization) of the hardware resource(s) of the server 202 by the network service 220 while serving connections having similar operation factors, i.e., TCP, X milliseconds response time and Y requests per second.

In such case, assuming that R(RT) is significantly increased and higher compared to R(P), the trained ML model(s) may output an indication that the certain connection is a suspected connection estimated to induce the degradation of the performance of the network service 220.

It should be noted that while the suspected connections may be legitimate connections, it may be highly likely that one or more of the suspected connections may be malicious connections initiated as part of a cyberattack in attempt disrupt operation of the network service 220, for example, increase latency and response time of the network service potentially to the point of the network service 220 becomes unavailable.

Figure 3:
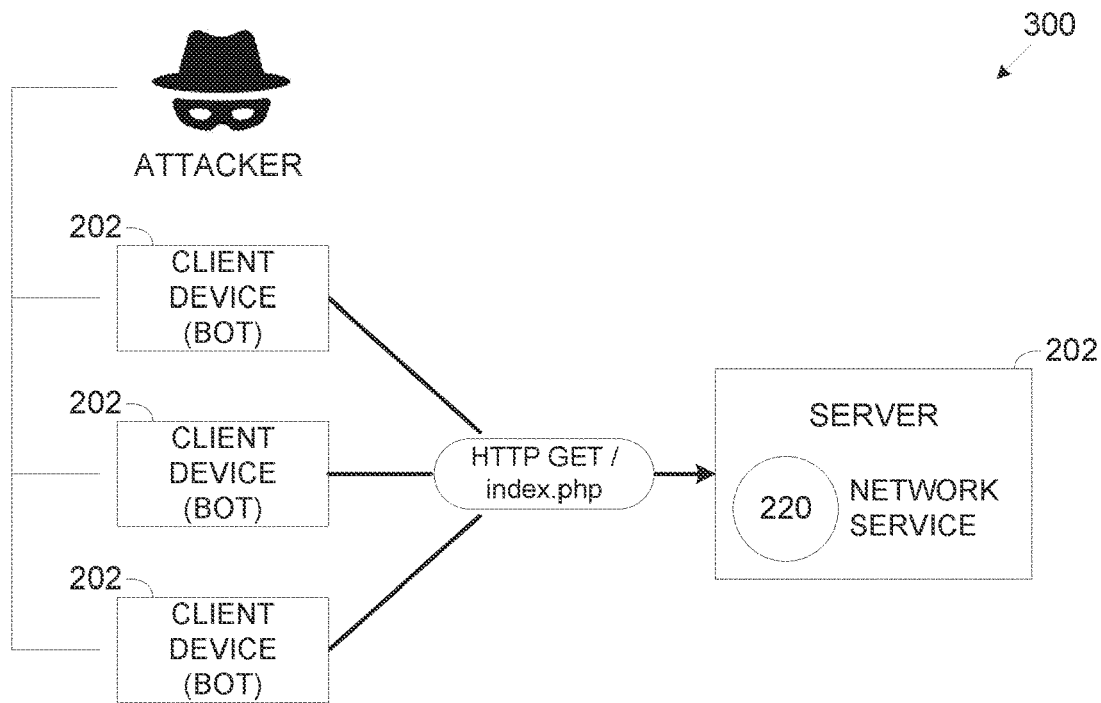
FIG. 3 is a schematic illustration of several cyberattack vectors.
Figure 3:
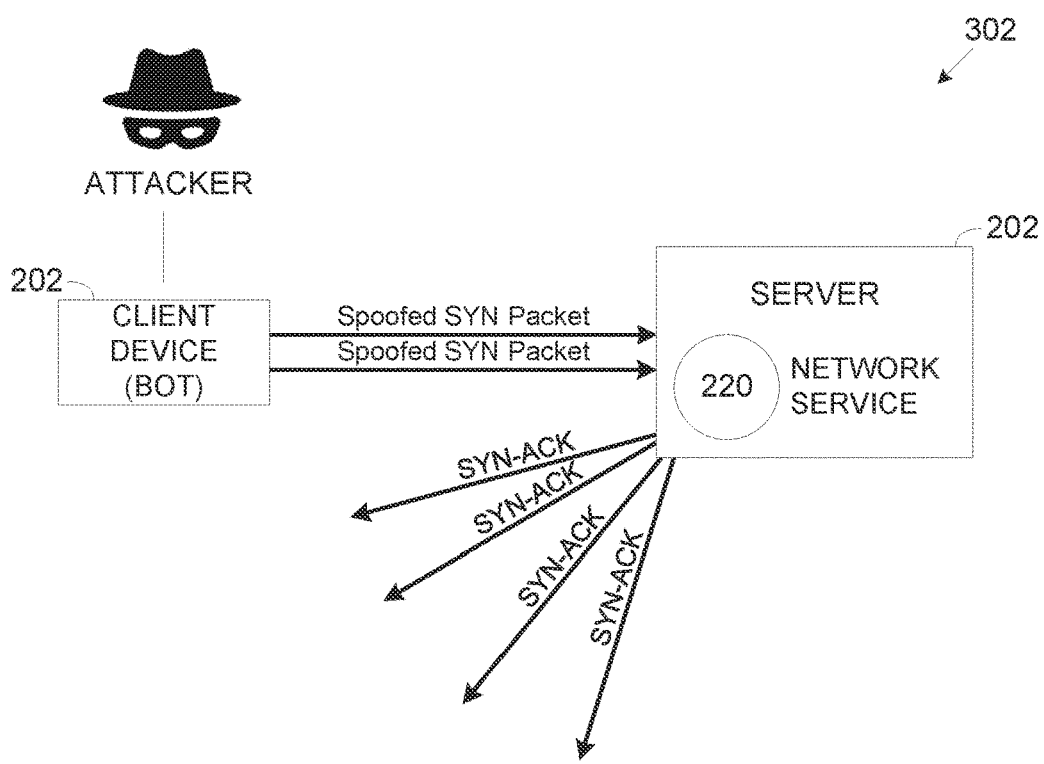

Reference is now made to FIG. 3, which is a schematic illustration of several cyberattack vectors.

As shown at 300, an exemplary cyberattack, for example, a Distributed Denial of Service (DDoS) may be initiated by flooding a network service such as the network service 220 by a plurality of requests transmitted by a plurality of client devices such as the client devices 204 which are typically bots controlled by an attacker in attempt to bring down the network service and make it unavailable thus inaccessible to legitimate users.

The DDoS attacks may be directed to the application layer of the network service 220. The most common application layer DDoS cyberattacks are HTTP flooding which may be grouped in four main categories as known in the art, basic HTTP floods, randomized HTTP floods, cache-bypass HTTP floods and WordPress XML-RPC floods.

The flood of HTTP requests received from the plurality of bot client devices 204 may consume all of the resources allocated for the network service 220 eventually resulting in Denial of Service (DoS).

As shown at 302, an exemplary cyberattack, for example, a DoS may be done through a SYN flood as known in the art initiated by an attacker operating one or more client devices 204, typically bots, to rapidly initiate a connection to the network service 220 without finalizing the connection. The SYN flood attack imitated by the bot(s0 exploits the TCP handshake, specifically the sequence of communication by which two network nodes initiate a network connection with each other, by sending the network service 220 a large number of TCP "Initial Connection Request" SYN packets with spoofed source IP addresses.

A service monitor such as the service monitor 222 may detect degradation of the network service 220 using the ML model(s) to identify one or more of the connections from the bot client devices 204 in 300 and/or 302 as suspected connections estimated to induce the degradation based on analysis of operational data captured for the network service 220.

Reference is made once again to FIG. 1.

Optionally, using the ML model(s), the service monitor 222 may identify one or more previously unknown negative operational factors based on a delta between detected degradation of the network service 220 and predicted degradation of the network service 220 predicted by the ML model(s) based on identified negative operational factors excluding the previously unknown negative operational factor(s).

This means that the service monitor 222 may apply the trained ML model(s) to identify negative operational factors of one or more suspected connections and estimate their impact on degradation of the performance of the network service 220 due to excessive utilization of the hardware resources of the server 202. The service monitor 222 may detect further degradation of the network service 220 which exceeds the degradation estimated by the ML model(s). The service monitor 222 may therefore infer that the delta degradation is induced by one or more connections having one or more operational factors which are not explicitly identified and/or are unknown from previous training of the ML model(s).

As shown at 110, the service access manager 224 may disconnect the suspected connections from the network service 220 temporarily and/or permanently.

Disconnecting the suspected connections from the network service 220 may enable the network service 220 to restore its performance since the root cause of the excessive resource utilization, namely the suspected connection(s) is removed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models, neural network, clustering algorithms and classification algorithms are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically mitigating potential network services attacks based on service usage patterns learned using Machine Learning (ML), comprising:
   using at least one processor for:
      collecting operational data indicative of resource utilization of at least one network service serving a plurality of connections and of a plurality of operational factors of the plurality of connections, wherein each of the plurality of operational factors is a member of a group comprising: a type of a respective connection, a protocol of the respective connection, an origin of the respective connection, a destination of at least one packet received via the respective connection, a number of requests from the respective connection per second, a number of responses to the respective connection per second, an average delay between a request and a response on the respective connection, a traffic volume received via the respective connection, and a traffic volume transmitted via the respective connection;
      detecting degradation of the at least one network service based on analysis of the operational data;
      applying at least one trained ML model to the operational data in order to identify at least one negative operational factor of at least one suspected connection to the network service estimated to induce the degradation, the at least one ML model is trained to predict an impact pattern induced by each of a plurality of operational factors of a plurality of connections on the resource utilization of the at least one network service; and
      disconnecting, at least temporarily, the at least one suspected connection from the at least one network service.

2. The method of claim 1, wherein the operational data comprises at least one application layer parameter of the at least one network service, the at least one application layer parameter is a member of a group comprising: a latency, a response time, a number of connections, and a traffic volume.

3. The method of claim 1, wherein the operational data comprises at least one transport layer parameter relating to the at least one network service, the at least one transport layer parameter is a member of a group comprising: a connection error, a connection abort event, and a request response time.

4. The method of claim 1, wherein the operational data comprises at least one resource utilization parameter relating to at least one hardware resource of at least one server hosting the at least one network service, the at least one resource utilization parameter is a member of a group comprising: a processor utilization, a dynamic memory utilization, a persistent memory utilization, and a network interface utilization.

5. The method of claim 1, wherein the at least one negative operational factor is characterized by having a significant impact on the resource utilization of the at least one network service due to significant increase in utilization of at least one hardware resource of the at least one network service.

6. The method of claim 1, wherein the at least one ML model is a supervised learning ML model trained using a training dataset comprising labeled training operational data correlating between a plurality of operational factors and resource utilization of the at least one network service.

7. The method of claim 6, wherein the training operational data is captured for the network service during a predefined time period.

8. The method of claim 1, wherein the at least one ML model is further trained online after deployed to identify potential negative operational factors estimated to induce service degradation of the at least one network service.

9. The method of claim 1, further comprising identifying at least one previously unknown negative operational factor based on a delta between detected degradation of the at least one network service and predicted degradation of the at least one network service predicted by the at least one M L model based on identified negative operational factors excluding the at least one previously unknown negative operational factor.

10. A system for automatically mitigating potential network services attacks based on service usage patterns learned using Machine Learning (ML), comprising:

at least one processor configured to execute a code, the code comprising:

code instructions to collect operational data indicative of resource utilization of at least one network service serving a plurality of connections and of a plurality of operational factors of the plurality of connections, wherein each of the plurality of operational factors is a member of a group comprising: a type of a respective connection to which the respective operational factor relates, a protocol of the respective connection, an origin of the respective connection, a destination of the respective connection, a number of requests from the respective connection per second, a number of responses to the respective connection per second, an average delay between a request and a response on the respective connection, a traffic volume received via the respective connection, a traffic volume transmitted via the respective connection, and a number of simultaneous connections having similar operational parameters;

code instructions to detect degradation of the at least one network service based on analysis of the operational data;

code instructions to apply at least one trained ML model to the operational data in order to identify at least one negative operational factor of at least one suspected connection to the network service estimated to induce the degradation, the at least one ML model is trained to predict an impact pattern induced by each of a plurality of operational factors of a plurality of connections on the resource utilization of the at least one network service; and code instructions to disconnect, at least temporarily, the at least one suspected connection from the at least one network service.

11. The system of claim 10, wherein the operational data comprises at least one application layer parameter of the at least one network service, the at least one application layer parameter is a member of a group comprising: a latency, and a response time.

12. The system of claim 10, wherein the operational data comprises at least one transport layer parameter relating to the at least one network service, the at least one transport layer parameter is a member of a group comprising: a connection error, a connection abort event, and a request response time.

13. The system of claim 10, wherein the operational data comprises at least one resource utilization parameter relating to at least one hardware resource of at least one server hosting the at least one network service, the at least one resource utilization parameter is a member of a group comprising: a processor utilization, a dynamic memory utilization, a persistent memory utilization, and a network interface utilization.

14. The system of claim 10, wherein the at least one negative operational factor is characterized by having a significant impact on the resource utilization of the at least one network service due to significant increase in utilization of at least one hardware resource of the at least one network service.

15. The system of claim 10, wherein the at least one ML model is a supervised learning ML model trained using a training dataset comprising labeled training operational data correlating between a plurality of operational factors and resource utilization of the at least one network service.

16. The system of claim 15, wherein the training operational data is captured for the network service during a predefined time period.

17. The system of claim 10, wherein the at least one ML model is further trained online after deployed to identify potential negative operational factors estimated to induce service degradation of the at least one network service.

18. The system of claim 10, further comprising identifying at least one previously unknown negative operational factor based on a delta between detected degradation of the at least one network service and predicted degradation of the at least one network service predicted by the at least one ML model based on identified negative operational factors excluding the at least one previously unknown negative operational factor.

* * * * *